UNITED STATES PATENT OFFICE 2,612,497

PROCESS FOR MANUFACTURE OF HEXOSE UREIDES AND THIOUREIDES

Hendrik W. Meijer, Veendam, Netherlands

No Drawing. Application January 12, 1949, Serial No. 70,586. In the Netherlands January 24, 1948

4 Claims. (Cl. 260—209)

My invention relates to the manufacture of nitrogen-containing derivatives of hexoses, and of compositions and baths containing the same.

It is known that urea can form ureides with glucose, galactose or arabinose. This reaction has hitherto been carried out in dilute aqueous solution, in the presence of acid as catalyst. The yields were small, while the reaction time was particularly long.

According to my invention nitrogen-containing derivatives of hexoses are now obtained in a simple manner, with a large yield and with a short reaction time. The process according to my invention consists in reacting hexoses (or polysaccharides which form hexoses under the reaction conditions) in the presence of a dehydrating agent with organic compounds containing at least one free $NH_2$ group and at least one unsubstituted or mono-substituted $NH_2$ group. The intention is to bind the water formed during the reaction or to remove it according as it is formed.

The reaction takes place as follows:

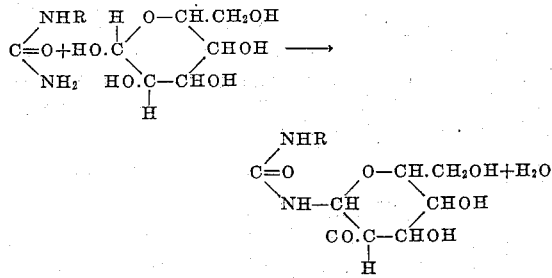

in which R represents hydrogen, an alkyl, an aryl or an alkyl-aryl group. Preferably the components are allowed to react with one another in the molten state. It is not essential that the initial material contain no water whatever. For practical reasons it may be preferable to work in the presence of a small quantity of water, but this quantity should preferably not be more than 10 or at most 20 per cent by weight of the total mixture. Examples of suitable hexoses are glucose, galactose, mannose and fructose. The initial material may also be polysaccharides which hydrolyse to hexoses under the reaction conditions. Thus in this case some water should be present to make this hydrolysis possible. Such saccharides are disaccharides, such as cane sugar, maltose, and lactose, while in principle one may also start from higher saccharides as initial material.

Examples of organic compounds which contain at least one free $NH_2$ group and at least one unsubstituted or mono-substituted $NH_2$ group are urea, thiourea, guanidine, as well as their alkyl, aryl or alkyl-aryl derivatives mono-substituted in one $NH_2$ group, such as methyl and butyl urea. Further, melamine and diamides, whether substituted or not. In general the process according to my invention aims at the preparation of such derivatives of hexoses and the nitrogen compounds referred to as do not polycondense in vitro to insoluble macromolecules in the presence of formaldehyde and an acid catalyst, as for instance urea itself would do within a few moments with formaldehyde; the nitrogen-containing derivatives of hexoses which are prepared in accordance with my invention are intended primarily for use in making cellulosic fabrics and threads crease-proof and unshrinkable by reaction in the presence of aldehydes with the cellulose, without a polycondensation with formation of synthetic resins thereby taking place in the fibre, as is the case in the known processes wherein cellulosic material is treated with urea and formaldehyde.

Suitable dehydrating agents are sulphuric acid, zinc chloride and phosphoric acid. In choosing the dehydrating agents and the quantities in which they are applied care should be taken that no undesirable side reactions with the reaction components occur. Further, care should be taken that, also as a result of the operating temperature, too great an excess of dehydrating agent does not cause the compound formed to hydrolyse, whereby the initial components are formed again, as the yield would thus decrease.

Having regard to the cost price and the availability of initial materials, the following will be of primary use: as hexoses, glucose; as hexose-forming polysaccharides, cane sugar; as nitrogen compounds, urea; and as dehydrating substance, sulphuric acid; but my invention is by no means confined thereto.

In the case of the preparation of glucose ureide from equimolecular quantities of glucose and urea with the application of sulphuric acid as dehydrating agent the process according to my invention is carried out, for instance, as follows:

About 10 per cent by weight of the total quantity of glucose to be added is introduced into a mixing apparatus provided with a stirrer and a hot-water jacket and all the water is subsequently added, after which a syrupy solution is obtained. Then all the urea is added while stirring, until a smooth paste is obtained. The remaining glucose is then introduced into this paste, in portions if considered desirable, as a result of which a sticky, molten mass is formed. Finally, a mixture of sulphuric acid and water is added in the course of about 1 to 2 hours, after which the mass is maintained at 60° C. for about a further 8 to 10 hours, with intensive stirring. A waxy mass is then obtained, which has a somewhat brown colour and is no longer sticky at all. The glucose ureide subsequently crystallises out as a crumbly, waxy substance, which can be further purified in the usual way if desired. To this end the mass, in aqueous solution, is freed from acid with calcium carbonate or barium carbonate and subsequently decolorised with a decolorising agent, such as bone charcoal, norit (activated carbon), silica gel or synthetic resin, after which if desired pure white glucose ureide is obtained, with a yield of about 80 per cent, by evaporation. The concentrated syrup, however, contains glucose ureide in a yield of 95 per cent. For many applications the syrup as such can be put on the market.

The following examples show how the process of my invention may be carried into effect:

Example I 1020 grams of glucose hydrate are dissolved at 60° C. in 300 cc. of water, after which 3400 grams of urea are added in one lot, while stirring. When the temporarily decreased temperature has again been raised to 60° C., 9180 grams of glucose hydrate, in portions of about 1000 grams, are added while stirring. Subsequently 165 cc. of sulfuric acid of 98 per cent. concentration, diluted with 300 cc. of water, are added. The addition of the glucose and of the sulphuric acid takes 1½ hours. The mixture is allowed to react at 60° C. for 8 hours, after which the reaction is complete.

When the glucose is melted with water as described above and urea is added, a crumbly, sticky mass is first formed, which when further quantities of glucose are added turns into a nearly dry, sticky, granular mass. Some time after the sulphuric acid and the water are added the mass begins to liquefy, forming a dark brown, non-sticky, viscous mass. This subsequently becomes supersaturated with the glucose ureide formed, which slowly begins to crystallize out, as a result of which the mass again becomes solid. Just sufficient water is then added to dissolve the mass; the free acid is then neutralised with calcium carbonate, whereafter decolorising with activated carbon is effected. After evaporation and if desirable recrystallisation, 9200 grams of pure white powder with a specific rotary power of −23° are obtained.

The total yield thereby amounts to 80 per cent., not taking into account the glucose ureide present in the mother liquor, which can be used for starting up a fresh charge.

The evaporated syrup contained 95 per cent. of the theoretical yield of glucose ureide and no longer contained any free glucose, as could be proved by means of fermentation tests in which no fermentation occurred, since glucose ureide generates no alcoholic fermentation, whereas glucose does, also in a medium rich in glucose ureide.

Example II

The same course was followed as in Example I, with the difference that now instead of 10.2 kilograms of glucose hydrate the same quantity of cane sugar was used, while the quantity of water was increased by 550 grams in order to bring about the hydrolysis. A clear syrup was obtained, which can be applied as such.

Example III

The same course was followed as in Example I, with the difference that now one mol. of thiourea was used per mol. of urea.

The nitrogen-containing derivatives of hexoses obtained according to my invention are particularly suitable for application in the textile and the paper industry, in the former industry for making threads and fabrics crease-proof and unshrinkable, and in the latter industry for obtaining paper and cardboard that is resistant to moisture and water.

To this end compositions and baths are prepared according to a further feature of my invention, which in addition to the above mentioned derivatives also contain aldehydes, such as formaldehyde, or substances which form them during the treatment, and also acids, or substances which form acids during the treatment. Moreover, if desired, the usual auxiliary substances, such as sulphonates, sulphated alcohols, pigments and dyes can be added to these compositions and treating baths.

I claim as my invention:

1. A process for the preparation of hexose ureides and thioureides, comprising condensing a hexose reactant with a reactant selected from the group consisting of urea and thiourea, splitting out an equivalent of water, upon heating the reactants to a temperature from about 60° to about 100° C. in the presence of water and a dehydrating agent selected from the group consisting of sulphuric acid, zinc chloride and phosphoric acid the water being present in an amount of at most 20% by weight of the total mixture.

2. A process according to claim 1, wherein the temperature is kept at about 60° C.

3. A process according to claim 1, wherein the quantity of water does not exceed 10% by weight of the total mixture.

4. A process according to claim 1, wherein the hexose reactant is cane sugar which hydrolyzes to glucose, the glucose being formed under the conditions of the reaction.

HENDRIK W. MEIJER.

REFERENCES CITED

The following references are of record in the file of this patent:

UNITED STATES PATENTS

| Number | Name | Date |
|---|---|---|
| 1,674,923 | Schnorf | June 26, 1928 |
| 1,862,270 | Kallner | June 7, 1932 |
| 2,116,640 | Quehl | May 10, 1938 |
| 2,247,913 | Klarer | July 1, 1941 |
| 2,268,780 | Schonle | Jan. 6, 1942 |

OTHER REFERENCES

Schoorl: Rec. Trav. Chim., v. 22 (1903), pages 31–33, 66–69 and 77, 8 pages.

Morrell et al.: J. C. S. Transactions, v. 91 (1907), page 1011.

Berger et al.: J. Org. Chem., v. 11 (1946), page 75.

McPherson et al.: "A Course in Gen. Chem.," 3rd ed., 1927, pages 306, 311, 312, 3 pages.